US012434406B2

(12) United States Patent
Adrian et al.

(10) Patent No.: US 12,434,406 B2
(45) Date of Patent: Oct. 7, 2025

(54) MOLD CORE

(71) Applicant: BESSER COMPANY, Alpena, MI (US)

(72) Inventors: Zachary Thomas Adrian, Alpena, MI (US); Todd Michael O'Neil, Alpena, MI (US)

(73) Assignee: BESSER COMPANY, Alpena, MI (US)

( * ) Notice: Subject to any disclaimer, the term of this patent is extended or adjusted under 35 U.S.C. 154(b) by 283 days.

(21) Appl. No.: 18/142,521

(22) Filed: May 2, 2023

(65) Prior Publication Data

US 2023/0356431 A1 Nov. 9, 2023

Related U.S. Application Data

(60) Provisional application No. 63/337,741, filed on May 3, 2022.

(51) Int. Cl.
*B28B 7/28* (2006.01)
*B28B 7/00* (2006.01)

(52) U.S. Cl.
CPC .............. *B28B 7/28* (2013.01); *B28B 7/0008* (2013.01)

(58) Field of Classification Search
CPC ............ B28B 7/0008; B28B 7/16; B28B 7/28
See application file for complete search history.

(56) References Cited

U.S. PATENT DOCUMENTS 6,604,930 B1 8/2003 Lumsden et al.

OTHER PUBLICATIONS

Besser, Molds For All Concrete Products Machines, undated.

*Primary Examiner* — James Sanders
(74) *Attorney, Agent, or Firm* — Mechanicus PLLC

(57) ABSTRACT

A mold core (and method for making same), for a concrete product mold comprising a mold core wall shaped to extend from a mold surface into an interior of the mold, preventing concrete from filling an area of the mold interior when the mold core is installed on the mold surface, the mold core wall comprising welded-together steel wire.

5 Claims, 8 Drawing Sheets

MOLD CORE

CROSS-REFERENCES TO RELATED APPLICATIONS

This application claims the benefit of the filing date of U.S. Provisional Patent Application Ser. No. 63/337,741 filed May 3, 2022.

BACKGROUND

Field

This application relates generally to mold cores.

Description of Related Art Including Information Disclosed Under 37 CFR 1.97 and 1.98

Mold cores are mold components supported in such a way as to extend into a mold cavity where, during a molding or casting process, they prevent material from flowing into the portion of the mold cavity occupied by the mold core, resulting in a hollow portion being formed in a cast article. Mold cores of the type used for manufacturing concrete 'cinder' blocks often include ventilation valves that can open to allow airflow into the mold core to aid in easier separation of a molded block from the mold/mold core without damage. These mold cores are traditionally made from press-brake bending of metal sheets that are attached together, while bodies of the ventilation valves are separately machined and then attached later in the manufacturing process.

SUMMARY

A mold core for a concrete product mold comprises a mold core wall shaped to extend from a mold surface into an interior of the mold. The mold core wall is shaped to prevent concrete from filling an area of the mold interior when the mold core is installed on the mold surface. The mold core wall comprises welded-together steel wire.

A method of manufacturing a mold core for a concrete product mold comprises the steps of forming a mold core by welding together metal wire, and smoothing surfaces of the welded-together wire which are positioned to shape a concrete product in the mold.

DRAWING DESCRIPTIONS

These and other features and advantages will become apparent to those skilled in the art in connection with the following detailed description and appended drawings of one or more embodiments of the invention, in which.

DETAILED DESCRIPTION

Figure 11:
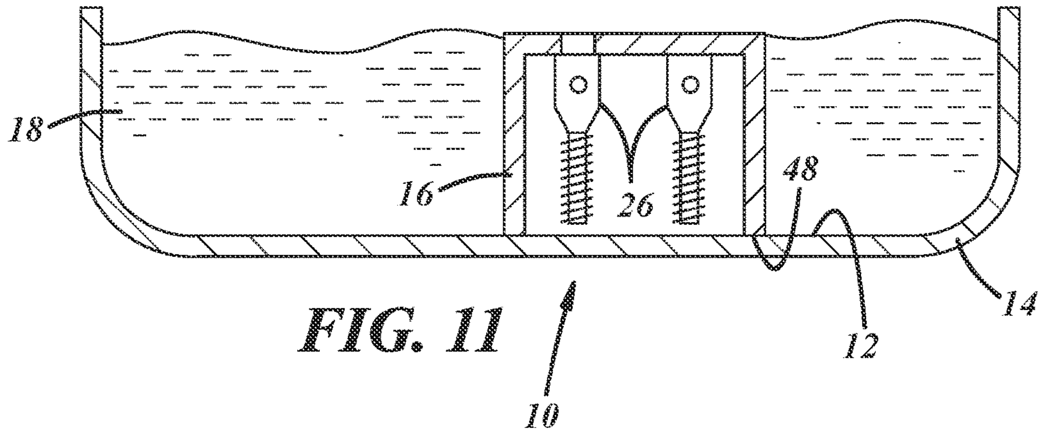
FIG. 11 is a simplified schematic side cutaway view showing the mold core of FIG. 8 installed in a mold filled with concrete.
Figure 6:
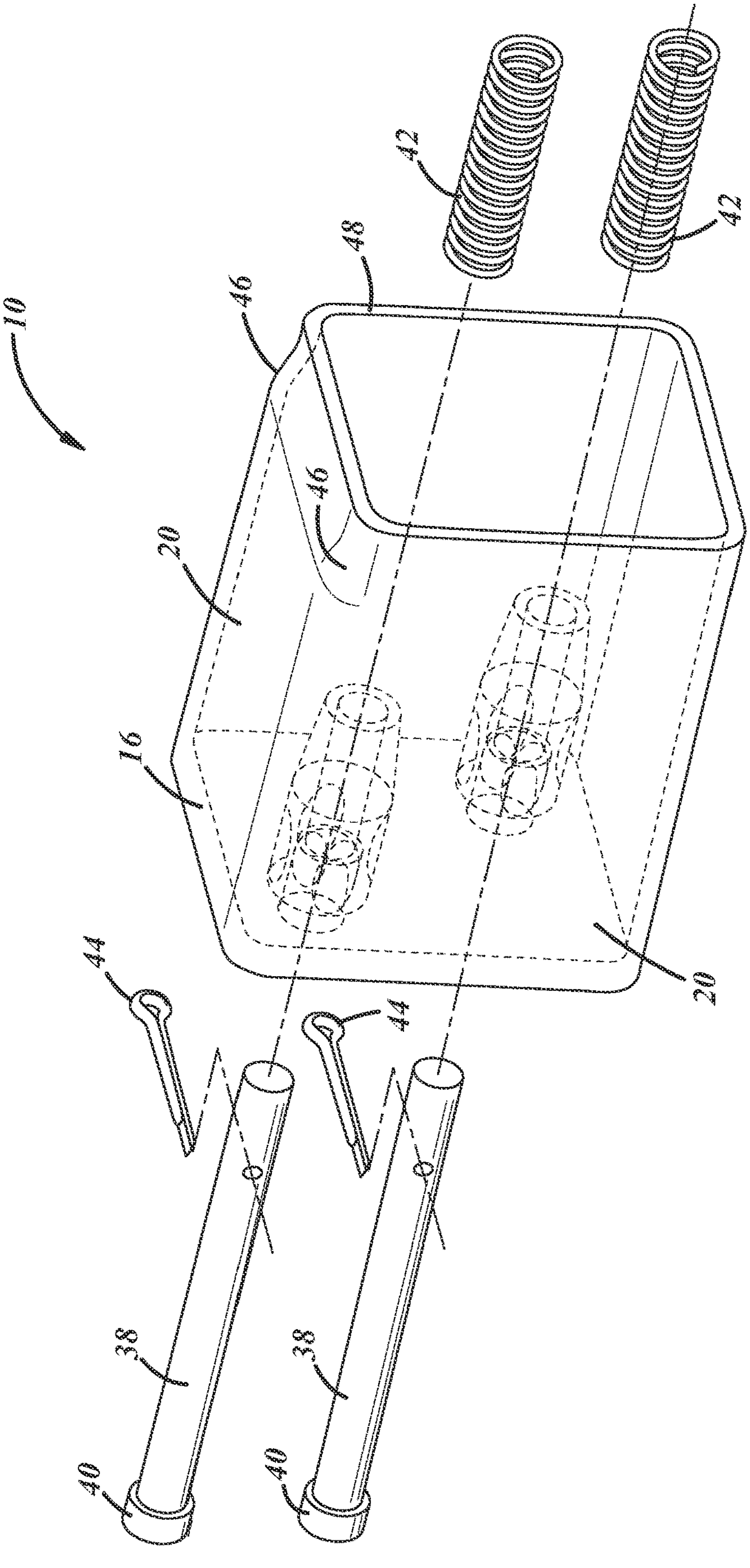
FIG. 6 is an exploded side perspective view of the mold core of FIG. 3, showing hidden interior structure in dashed lines.
Figure 7:
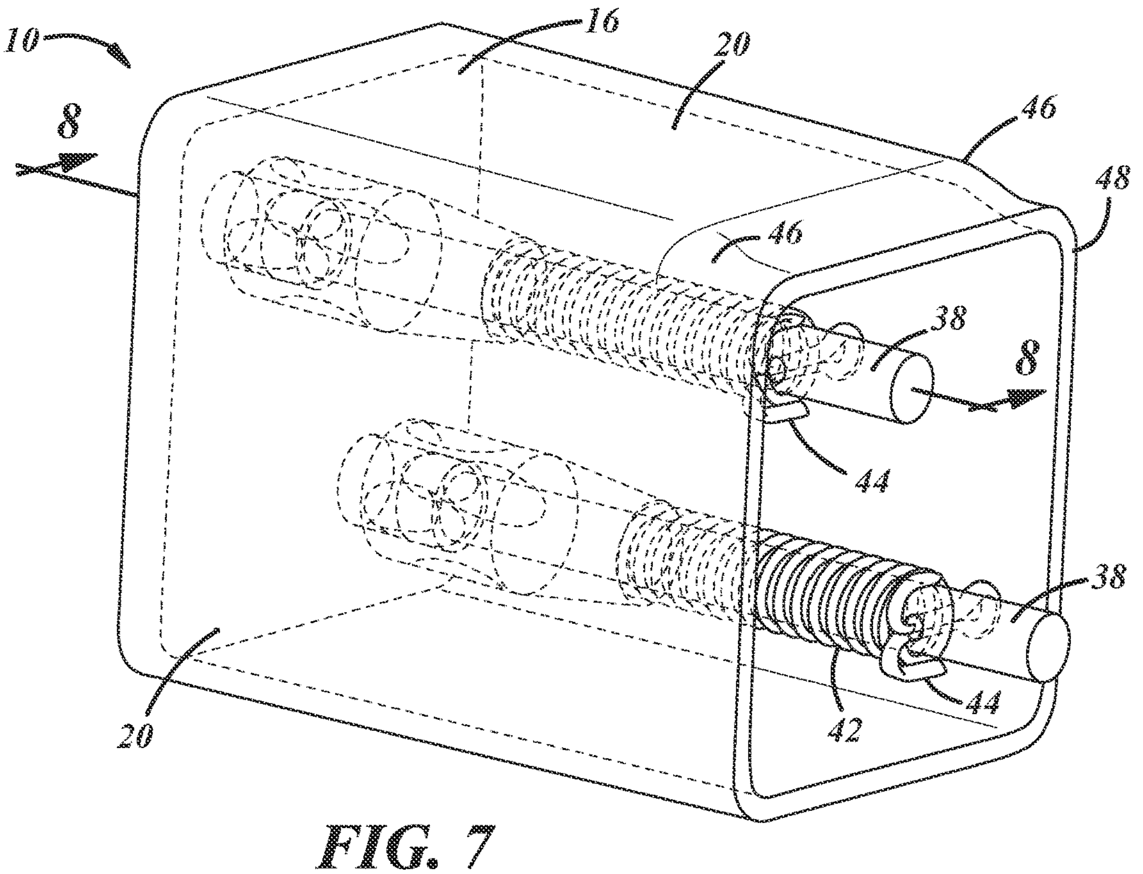
FIG. 7 shows the view of FIG. 6 albeit with the components all assembled.

A mold core for a concrete product mold is generally shown in the Figures at 10. The mold core 10 may be shaped for installation against a mold surface 12 within the mold 14, and the core 10 may comprise a mold core wall 16 that is shaped so that it extends inward from the mold surface 12 to an interior of the mold 14, or mold cavity, to prevent concrete 18 from filling a portion of the mold cavity occupied by the mold core 10, when the mold core 10 is installed in the mold 14 as shown in FIG. 11. According to the example provided in the Figures, the mold core wall 16 may include four side wall portions 20 and an inner end wall portion 22, but in other embodiments, the mold core wall 16 may have any number of wall portions 20/22 and may have any shape suitable for forming a desired cavity in a concrete product. The side wall portions 20 and the inner end wall portion 22 of the mold core wall 16 may all be integrally formed together as a single unitary piece.

Figure 5:
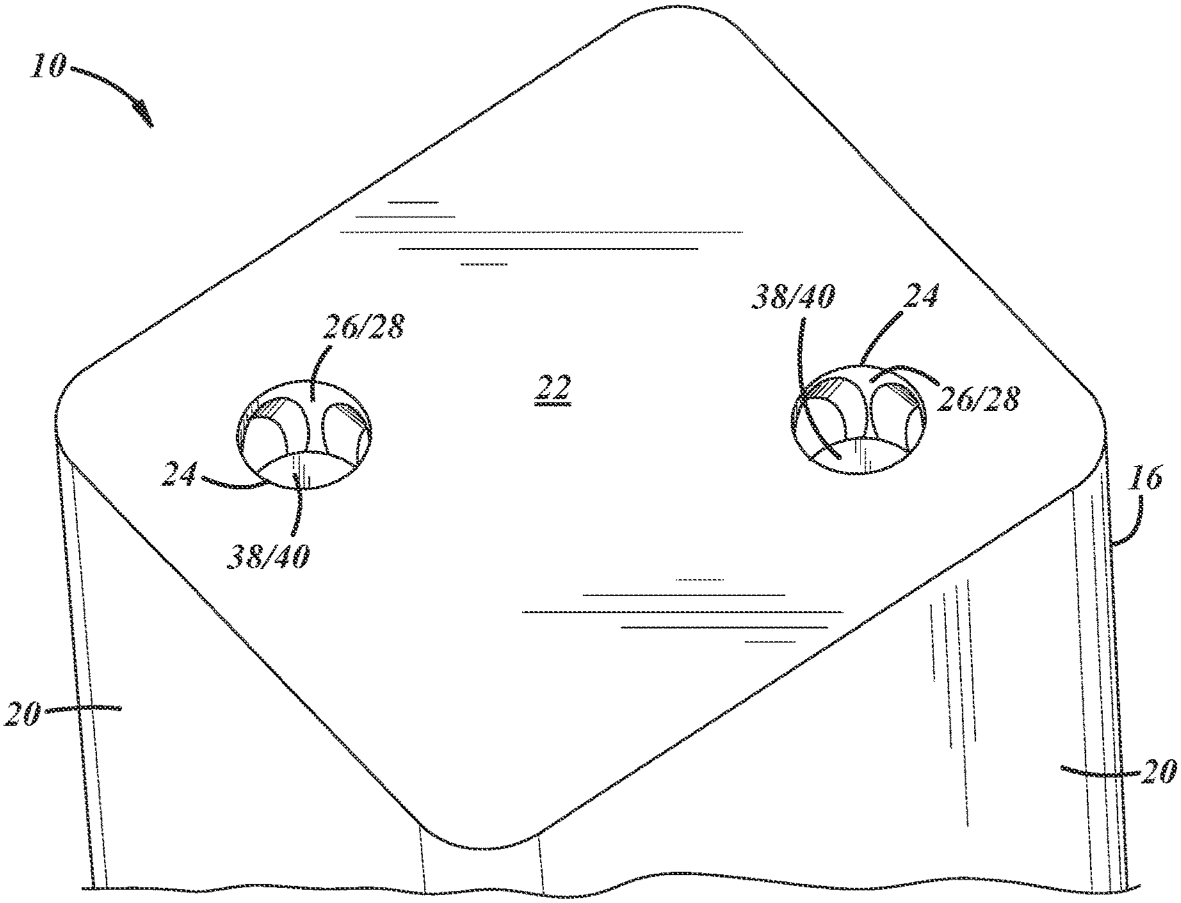
FIG. 5 is a perspective view of an inner end of the mold core of FIG. 3.

As best shown in FIG. 5, the mold core 10 may include one or more ventilation openings 24 that may be located at, and extend through, the inner end wall portion 22 of the mold core wall 16 to allow air to pass through the inner end wall portion 22 of the mold core wall 16. Allowing air through this ventilation opening 24 reduces the difficulty of separating cast articles from the mold 14 and/or mold core 10 without damage.

Figure 8:
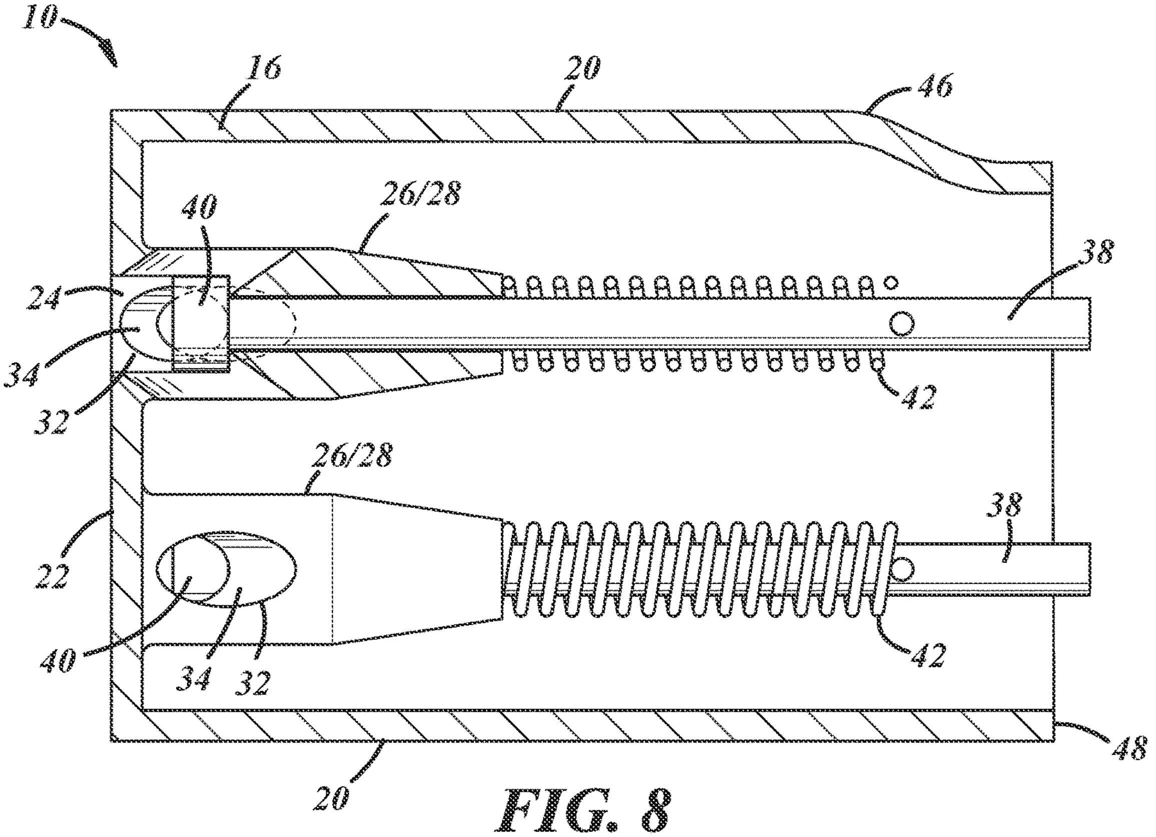
FIG. 8 is a cutaway side view of the mold core taken along line 8-8 of FIG. 7.
Figure 9:
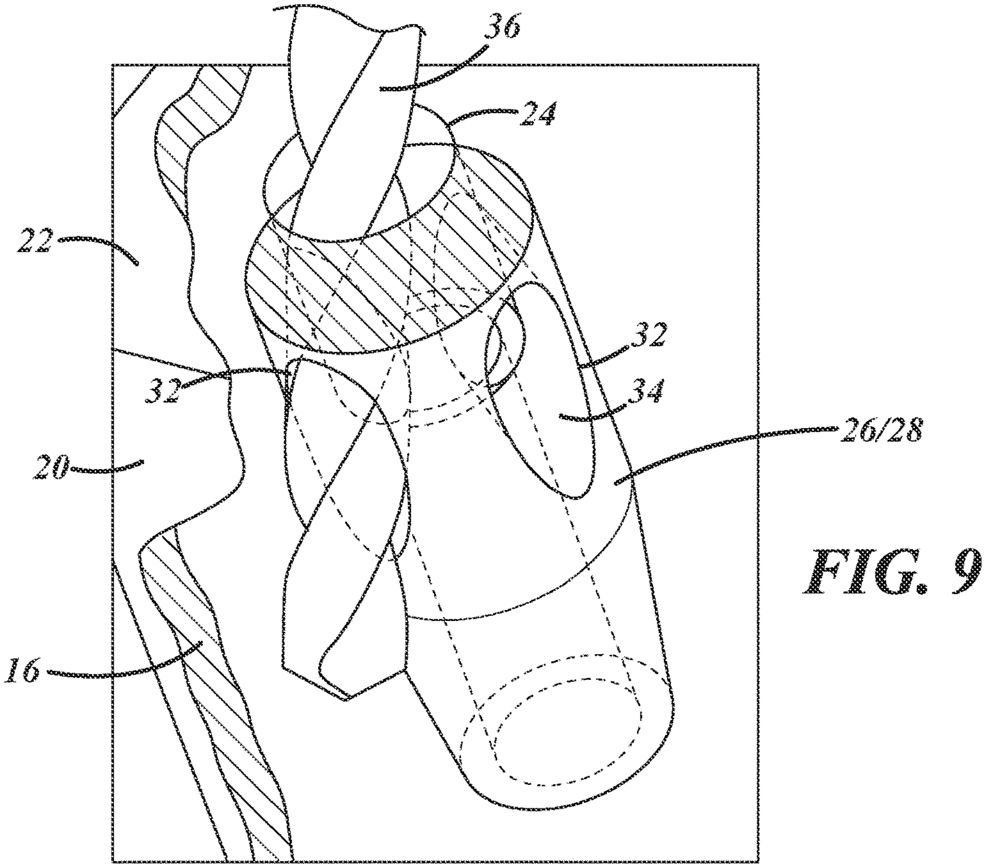
FIG. 9 is a partial cutaway perspective detail view of a drill bit cutting a vent hole into a vent body through a ventilation opening in the inner end of the mold core.
Figure 10:
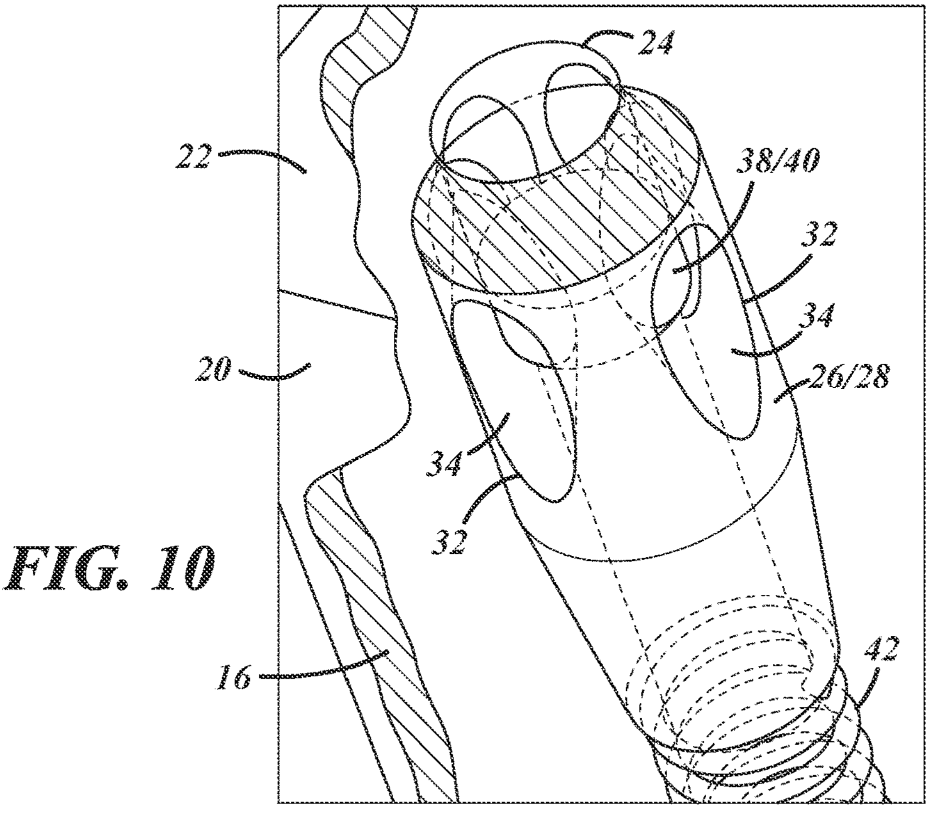
FIG. 10 shows the view of FIG. 9 with the drill bit removed.
Figure 12:
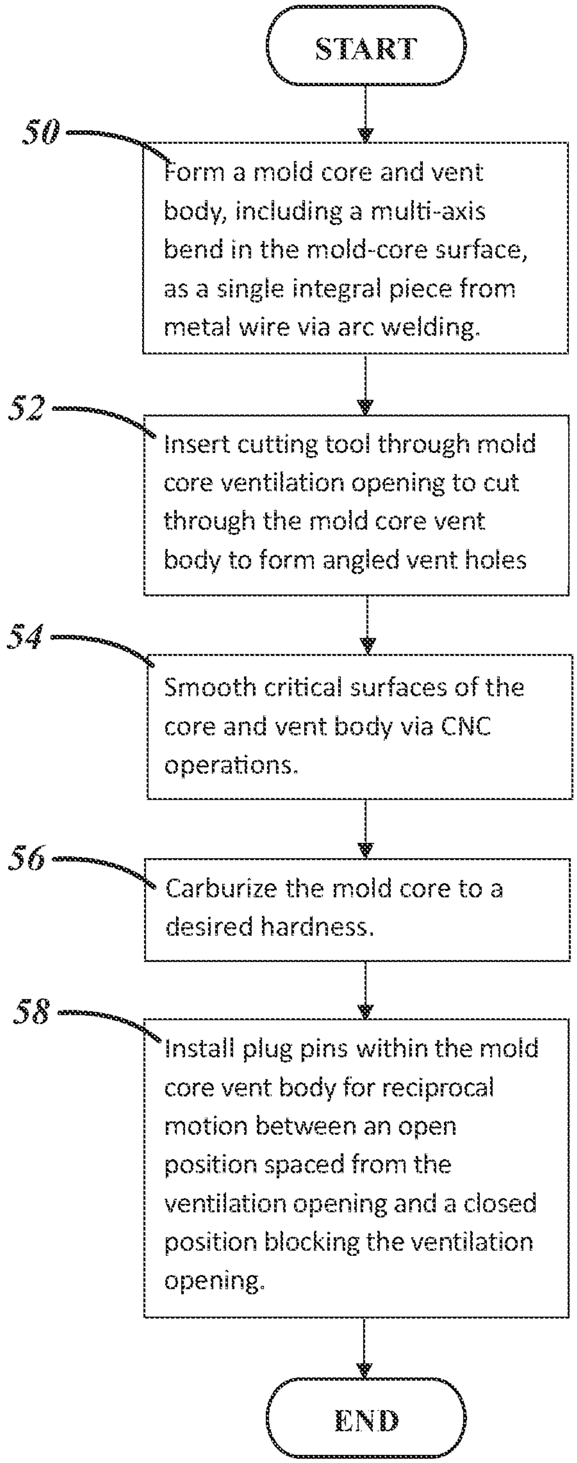
FIG. 12 is a flowchart showing a method for manufacturing a mold core.

The mold core 10 may also include a mold core vent body 26, best shown in FIGS. 8-10. The mold core vent body 26 may comprise a mold core vent sidewall 28 that may be generally tubular in shape and that may be integrally formed with and extend outward from the inner end wall portion 22 of the mold core wall 16 and into an interior of the mold core 10 from around the mold core ventilation openings 24. As shown in the Figures, some embodiments of the mold core 10 may include more than one mold core ventilation opening 24 with a mold core vent body 26 extending from around each of them.

The Figures show each vent body 26 and mold core ventilation opening 24 located on the inner end wall portion 22 of the mold core wall 16, disposed generally opposite a mold core outer end 48 that is configured to be attached to, or otherwise rest adjacent to, the mold surface 12 during the molding process, as shown in simplified view by FIG. 11 (FIG. 11 omits most details of the mold 14 and any related machinery for clarity). However, in other embodiments, the mold core ventilation openings 24 may be located on and extend through any portion of the mold core wall 16 that faces into the interior of the mold 14.

The mold core wall 16 may comprise welded-together steel wire 30. which may be built up vertically (or outwardly, relative to the inner end wall portion 22), layer-upon-layer.

Figure 1:
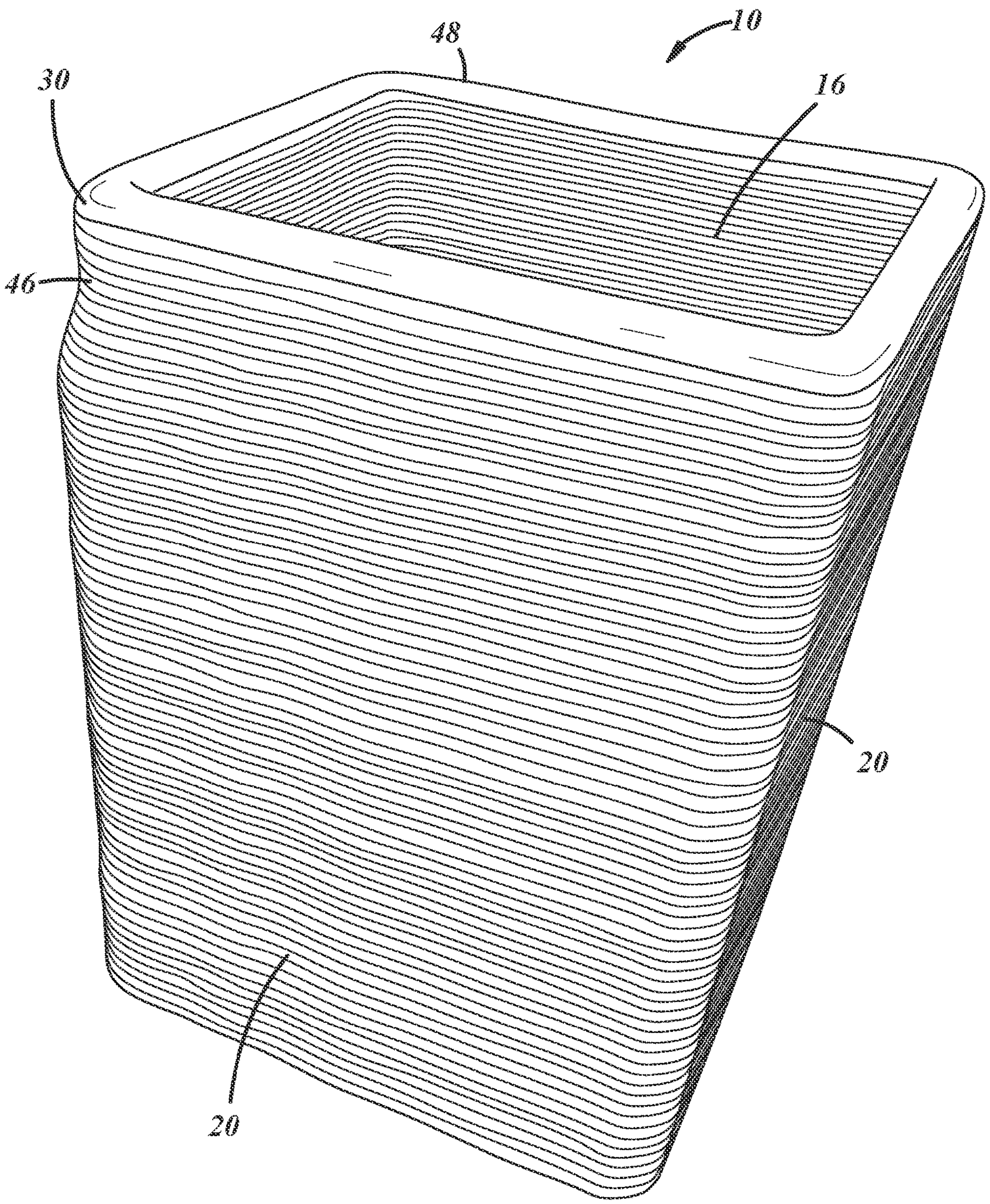
FIG. 1 is a perspective view of a mold core constructed of welded wire.
Figure 2:
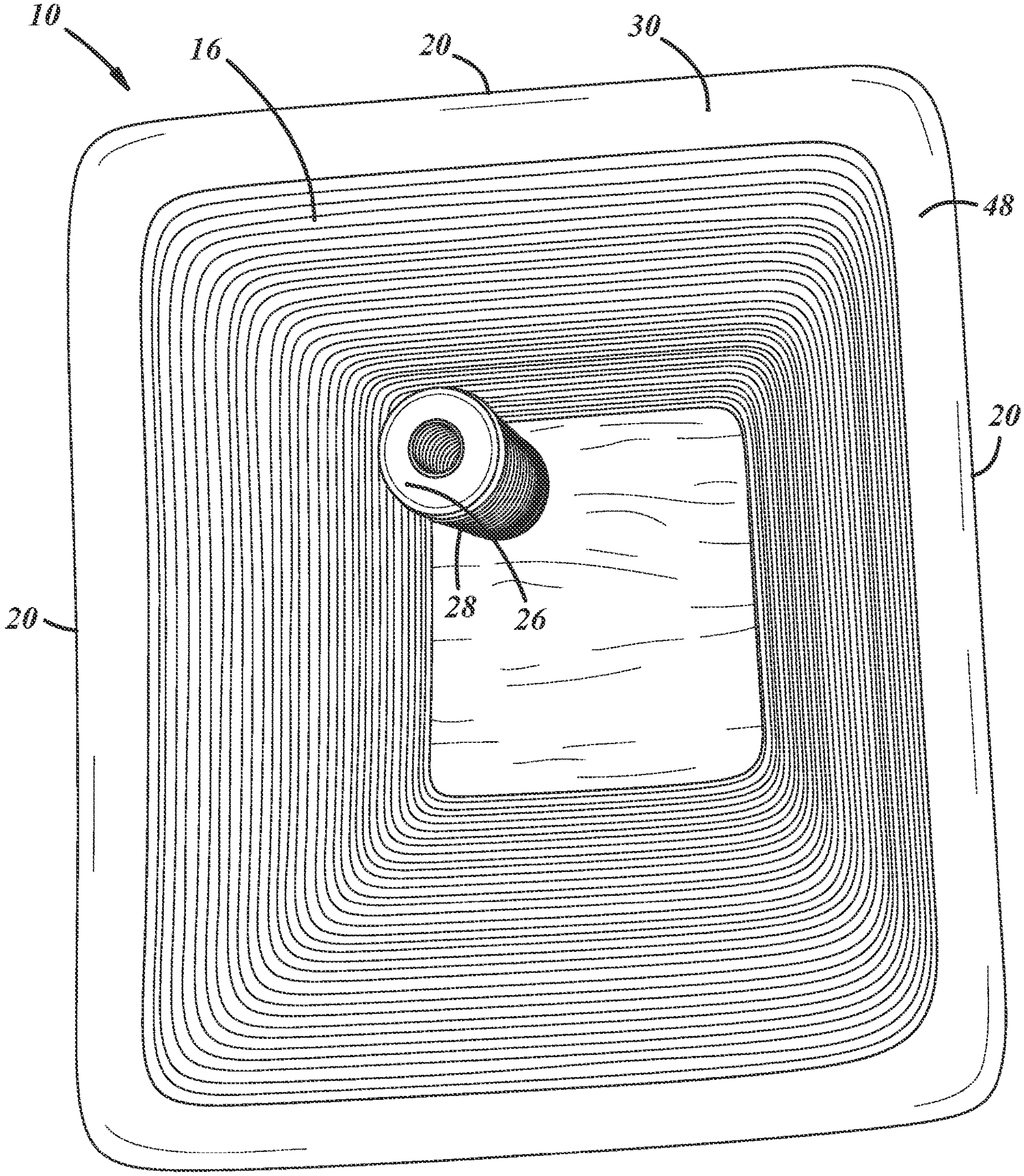
FIG. 2 is a perspective view through an outer end of the mold core of FIG. 1.

As shown in FIGS. 1 and 2, the mold core wall 16 and mold core vent body 26 may be integrally formed as a single unitary piece from the welded-together steel wire 30. In other embodiments, any suitable material or combination of materials may be used, and strands of such material may be built-up in any direction suitable for achieving a desired mold core configuration. The irregularities left on various mold core surfaces by the wire layers, shown in FIGS. 1 and 2, may then be smoothed by any suitable tool, and the rest of the Figures show the mold core 10 after its surfaces have been smoothed.

One or more angled vent holes 32 may extend through the core vent sidewall 28, as best shown in FIGS. 4-10. These vent holes 32 may be spaced circumferentially around the core vent sidewall 28, and the vent holes 32 may be angled to be in general alignment with at least a portion of the mold core ventilation opening 24. In other words, an imaginary cylinder filling the angled vent hole 32—and passing parallel to the vent hole's perimeter surface 34 in the core vent sidewall 28—could be extended or translated lengthwise until one of the cylinder's circular ends passes through the mold core ventilation opening 24 in the mold core wall 16. This design permits the vent holes 32 to be easily cut into the core vent sidewall 28 during manufacturing by a tool 36 inserted through the ventilation opening 24, as shown in FIG. 9. This design also allows the vent holes 32 to be easily cleaned and cleared of debris, after use, via cleaning implements inserted in the same way. This design addresses the access limitations resulting from manufacturing the core vent body 26 and mold core wall 16 as a single piece, which prevent the core vent body 26 from being separately machined during construction, or easily cleaned after use.

The mold core vent body 26 may also be shaped to receive a plug pin 38, shown in FIGS. 3-8. The plug pin 38 is supported for reciprocal motion within the mold core vent body 26 between an open position spaced from the mold core ventilation opening 24 to allow air to move through the ventilation opening 24, and a closed position blocking the mold core ventilation opening 24 so that a head 40 of the plug pin 38 lies flush with the inner end wall portion 22 of the mold core 10 to prevent material from leaking out of the mold 14 during the molding process. As shown in FIGS. 3-8, the plug pin may be spring-biased into the open position by a spring 42 secured by a retaining pin 44.

Figure 3:
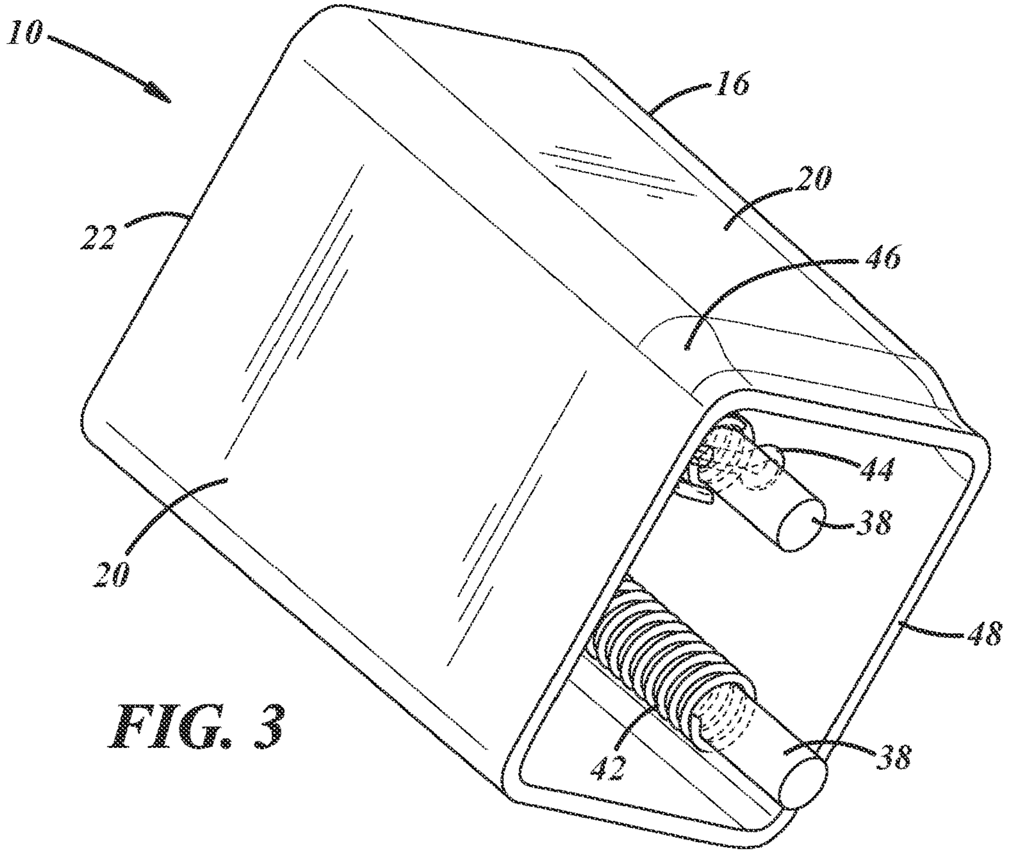
FIG. 3 is a perspective view of the mold core of FIG. 1 after smoothing of its surfaces and with the installation of plug pins, springs, and retaining pins.
Figure 4:
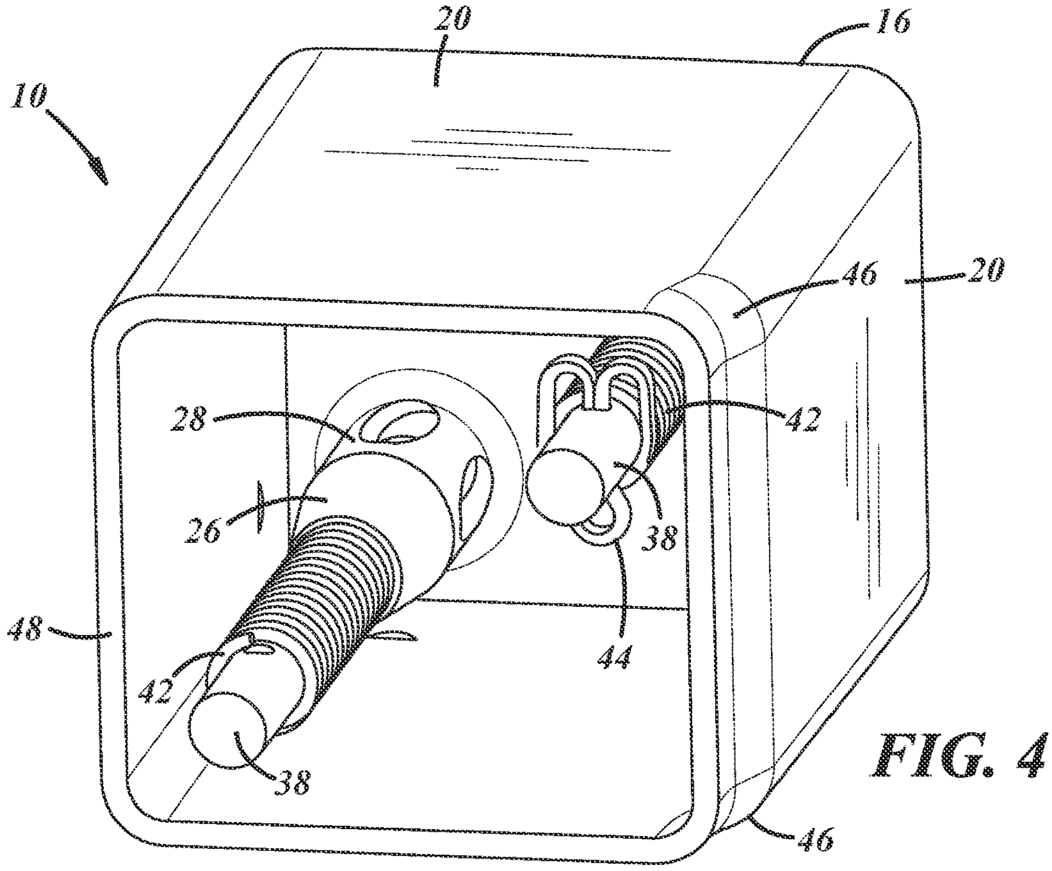
FIG. 4 is a perspective view through the outer end of the mold core of FIG. 3.

As best shown in FIG. 3, the mold core wall 16 may comprise a shape including one or more multi-axis curves 46. The mold core wall 16 may be fabricated to include these curves 46 during (and by) the welding process. Heat produced during the welding process may be used (in addition to physical positioning of the wire 30) to form and retain any suitable desired mold core wall shape, which may include complex contours not achievable by, and not requiring, brake press or other kinetic bending means. The example shown in FIG. 3 depicts at least one of the multi-axis curves 46 as a conjunction of a rounded corner and horizontal step located adjacent the mold core's inner end wall portion 22.

In practice, a mold core 10 for a concrete product mold may be manufactured by forming a mold core 10 by welding together metal wire 30, and then smoothing surfaces of the welded-together wire 30 that are positioned to shape a concrete product.

The formation of the mold core 10 may comprise welding the wire 30 into a shape comprising at least one multi-axis curve 46.

The formation of the mold core 10 may also comprise welding the wire 30 into the shape of a mold core wall 16 that includes a ventilation opening 24, and into the shape of a vent body 26 that integrally extends from the mold core wall 16 from around the ventilation opening 24. Formation of the mold core 10 may further include forming one or more vent holes 32 into the mold core vent body 26. For each such vent hole 32, a cutting tool 36 may be inserted through the mold core ventilation opening 24 until it reaches the mold core vent body 26, and then causing the cutting tool 36 to cut through the mold core vent body 26 in a position that will permit airflow through both the ventilation opening 24 and vent hole 32 when a plug pin 38 is received in the mold core vent body 26 and moved to an open position unblocking the ventilation opening 24.

The wire 30 may be welded in such a way as to form a mold core 10 shape that includes complex multi-axis curves 46. In some embodiments, the mold core openings 24 or vents 32 may be at least partially formed in this way, requiring only minimal machining to refine their shapes.

Mold core surfaces that are to contact the mold 14, shape a portion of a concrete product, or that require tight tolerances (e.g., surfaces and ends of the wall portions 20/22/48 of the mold core 10, or the interior of the ventilation opening 24 and vent body 26), may then be smoothed by, for example, CNC milling. CNC milling may also be used to form part or all of the mold core vent holes 32.

The mold core 10 may also be carburized to provide a desired level of hardness.

When constructed as disclosed above, a mold core can be manufactured to include geometries that would have been difficult or impossible to achieve using prior art methods. For example, complex multi-axis bends may be achieved according to the disclosed method, which are not achievable using the known method of welding press-brake-formed plates together. A mold core including a mold core vent of this design may be manufactured with the vent body incorporated as an integral part of the mold core, rather than as a separate piece that must be manufactured separately and then attached to the core later.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A method of manufacturing a mold core for a concrete product mold, the method comprising the steps of:

forming a mold core by welding together metal wire into the shape of a mold core including a ventilation opening, and into the shape of a vent body that integrally extends from the mold core from around the ventilation opening; and forming at least one vent hole into the vent body by inserting a cutting tool through the ventilation hole and causing it to cut through the vent body; and smoothing surfaces of the welded-together wire, which are positioned to shape a concrete product in the mold.

2. The method of claim 1 in which the step of forming a mold core comprises welding the wire into a shape comprising at least one multi-axis bend.

3. The method of claim 1 in which the step of forming a mold core comprises welding the wire into the shape of a vent body, the vent body receiving a plug pin for reciprocal motion between closed and open positions alternately blocking and unblocking the ventilation opening.

4. The method of claim 3 in which the step of forming the mold core additionally comprises integrally forming the core and vent body as a single unitary piece.

5. The method of claim 1 including the additional step of carburizing the mold core.

* * * * *